US009502963B2

(12) United States Patent
Koga

(10) Patent No.: US 9,502,963 B2
(45) Date of Patent: Nov. 22, 2016

(54) SWITCHING POWER SUPPLY DEVICE, SWITCHING POWER SUPPLY CONTROL METHOD AND ELECTRONIC APPARATUS

(71) Applicant: Sony Corporation, Tokyo (JP)

(72) Inventor: Tomohiro Koga, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/294,948

(22) Filed: Jun. 3, 2014

(65) Prior Publication Data

US 2014/0362614 A1 Dec. 11, 2014

(30) Foreign Application Priority Data

Jun. 10, 2013 (JP) .................................. 2013-121528

(51) Int. Cl.
| | | |
|---|---|---|
| *H02M 3/155* | (2006.01) | |
| *G05F 1/70* | (2006.01) | |
| *H02M 1/42* | (2007.01) | |
| *H02M 7/155* | (2006.01) | |
| *H02M 1/00* | (2006.01) | |

(52) U.S. Cl.
CPC .............. *H02M 1/4225* (2013.01); *G05F 1/70* (2013.01); *H02M 3/155* (2013.01); *H02M 7/1557* (2013.01); *H02M 2001/0009* (2013.01); *H02M 2001/0032* (2013.01); *H02M 2001/0058* (2013.01); *H02M 2003/1552* (2013.01); *Y02B 70/126* (2013.01); *Y02B 70/1491* (2013.01); *Y02B 70/16* (2013.01)

(58) Field of Classification Search
CPC ........... H02M 1/4225; H02M 1/4233; H02M 1/4241; H02M 1/4258; H02M 2001/4283; H02M 2001/4291; H02M 1/12; H02M 3/156; H02M 2003/1552; H02M 3/155; H02M 3/145; H02M 3/158; H02M 3/1588; H02M 3/1582; H02M 2001/0045; H02M 2001/0032; H02M 2001/0035; H02M 2001/0029; G05F 1/70
USPC ........................ 323/222, 280–285, 271, 273
See application file for complete search history.

(56) References Cited

U.S. PATENT DOCUMENTS

| | | | | |
|---|---|---|---|---|
| 7,750,615 | B2 * | 7/2010 | Jung et al. ..................... 323/282 |
| 8,482,271 | B2 * | 7/2013 | Prodic et al. ................. 323/285 |
| 8,570,019 | B2 * | 10/2013 | Nakamura .................... 323/284 |
| 2009/0323374 | A1 * | 12/2009 | Park ........................ H02M 1/36 363/16 |
| 2010/0135050 | A1 * | 6/2010 | Sonobe ...................... 363/21.07 |
| 2011/0007533 | A1 * | 1/2011 | Chiba ................. H02M 1/4208 363/126 |
| 2011/0255319 | A1 * | 10/2011 | Ayukawa ............ H02M 1/4225 363/126 |
| 2012/0032661 | A1 * | 2/2012 | Nakamura ............ H02M 3/156 323/288 |
| 2012/0155132 | A1 * | 6/2012 | Uno ..................... H02M 1/4225 363/80 |
| 2012/0212202 | A1 * | 8/2012 | Yang ..................... H02M 3/156 323/283 |
| 2012/0235623 | A1 * | 9/2012 | Ishino ................... H01M 10/44 320/101 |

FOREIGN PATENT DOCUMENTS

| | | |
|---|---|---|
| JP | 2011-019323 A | 1/2011 |
| JP | 2011-229255 A | 11/2011 |
| JP | 2012-090515 A | 5/2012 |

* cited by examiner

*Primary Examiner* — Timothy J Dole
*Assistant Examiner* — Bryan R Perez
(74) *Attorney, Agent, or Firm* — Sheridan Ross P.C.

(57) ABSTRACT

Provided is a switching power supply device in a critical mode, including a load detection section that detects a load. When the detected load is lighter than a setting value, an upper limit of a switching frequency is lowered stepwise.

15 Claims, 12 Drawing Sheets

SWITCHING POWER SUPPLY DEVICE, SWITCHING POWER SUPPLY CONTROL METHOD AND ELECTRONIC APPARATUS

CROSS REFERENCE TO RELATED APPLICATIONS

This application claims the benefit of Japanese Priority Patent Application JP 2013-121528 filed Jun. 10, 2013, the entire contents of which are incorporated herein by reference.

BACKGROUND

The present disclosure relates to a switching power supply device that rectifies an alternating current and generates a stable DC voltage, and particularly relates to a switching power supply device having a PFC control circuit.

Switching power supply devices having a PFC (Power Factor Correction) control IC can suppress the generation of a harmonic by correct a power factor. As this type of switching power supply device, a configuration (power supply device disclosed in Japanese Unexamined Patent Application Publication Nos. 2011-019323, 2011-229255 and 2012-090515) is proposed in which the switching frequency of a switching element is controlled in accordance with the state of a load.

SUMMARY

Japanese Unexamined Patent Application Publication No. 2011-019323 discloses a power supply device in which a frequency is switched in two stages. In this case, a great change in frequency causes instability of an operation during switching, and thus there is a problem in that a frequency is not able to be greatly changed.

Japanese Unexamined Patent Application Publication No. 2011-229255 discloses a technique in which a frequency is controlled by detecting a light load using a feedback voltage. Typically, when PWM (Pulse Width Modulation) control is performed using a feedback voltage, the interruption of PFM (Pulse Frequency Modulation) control using the same feedback voltage is very complicated in terms of an operation algorithm, and is not likely to be realized.

Japanese Unexamined Patent Application Publication No. 2012-090515 discloses a technique in which a light load is determined on the basis of information from a next-stage DC-DC converter circuit, a load and the like. Control is able to be facilitated, but there is a problem in that information from other circuits is necessitated.

Therefore, it is desirable to provide a switching power supply device, a switching power supply control method and an electronic apparatus which are capable of restricting an upper limit frequency of a switching frequency in multiple stages without necessitating information from other circuits.

According to an embodiment of the present disclosure, there is provided a switching power supply device of a critical mode, wherein when a load is detected and the detected load is lighter than a setting value, an upper limit of a switching frequency is lowered stepwise.

In the embodiment, the switching power supply device may further include: a series circuit of a coil and a semiconductor switching element; a rectifier circuit, connected to the semiconductor switching element, in which an output is extracted; and a pulse generator that generates a pulse signal for switching the semiconductor switching element. In a normal operation state, the pulse generator generates a pulse signal in which a current flowing to the rectifier circuit is changed to a level for turning on the semiconductor switching element at a timing of zero, and a level for turning off the semiconductor switching element at a timing based on a feedback voltage of an output voltage, and the pulse generator is controlled in a direction in which an upper limit of a frequency of the pulse signal is lowered stepwise, when a load is lighter than a setting value.

According to the present disclosure, in the switching power supply device in a critical mode, efficiency at the time of a light load can be improved by dropping the switching frequency at the time of the light load. Further, since the frequency upper limit is switched stepwise, it is possible to improve efficiency in a wide range, and to greatly change the frequency.

DETAILED DESCRIPTION OF EMBODIMENTS

Embodiments as described below are preferred specific examples of the present disclosure, and various limitations which are technically preferable are applied thereto. However, in the following description, unless there is a statement that particularly limits the present disclosure, the scope of the present disclosure is not intended to be limited to these embodiments.

Figure 1:
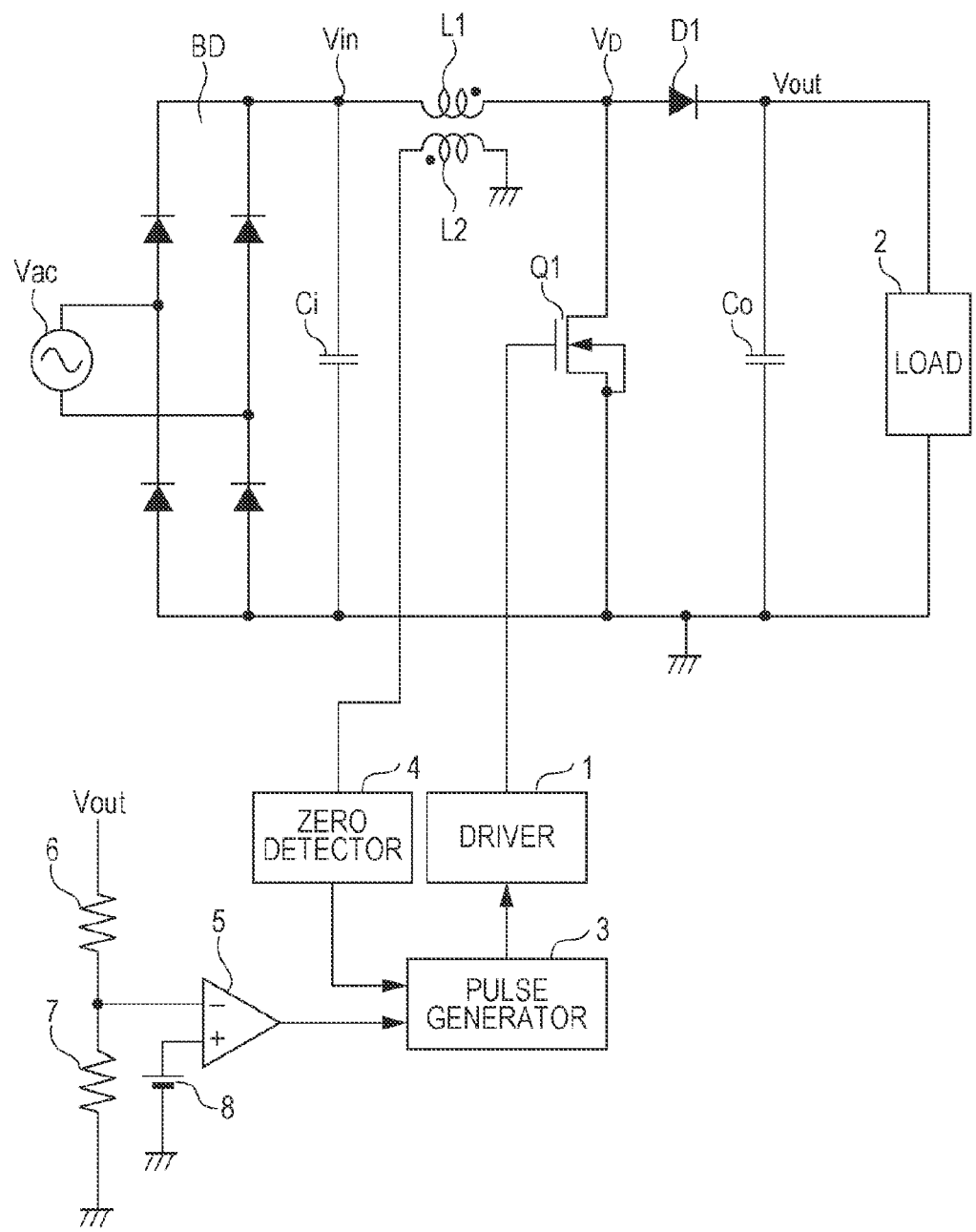
FIG. 1 is a connection diagram illustrating an example of a switching power supply device of a critical mode system of the related art.

The following description will be given in order below.
1. Reference Example of Power Supply Device
2. First Embodiment 3. Second Embodiment
4. Application Example
5. Modification Example
1. Reference Example of Power Supply Device A PFC circuit in a critical mode will be described with reference to FIGS. 1 to 3. The critical mode is a mode in which the zero detection of a current flowing through a rectifying diode is performed by a secondary winding provided in a choke coil, and a semiconductor switching element is turned on at a timing of current zero. A control system in which the semiconductor switching element is turned on before a current is reduced to zero is referred to as being in a continuous mode. A bridge rectifier circuit BD and a smoothing capacitor Ci rectify an AC voltage of an AC power supply (commercial power supply) Vac and supply a full-wave rectification voltage to the smoothing capacitor Ci. An input (DC) voltage Vin is output to both ends of the smoothing capacitor Ci.

One output terminal (ungrounded side) of the bridge rectifier circuit BD is connected to one end of a choke coil L1, and the other end of the choke coil L1 is connected to one output terminal through a diode D1. The drain and the source of a semiconductor switching element, for example, an FET (Field Effect Transistor) Q1 are connected between the connecting point of the other end of the choke coil L1 and the diode D1, and the other output terminal. The FET Q1 is, for example, an N-channel FET Q1. The source (the other output terminal) of the FET Q1 is grounded. A parasitic diode is present between the drain and the source of the FET Q1. A drive pulse formed by a driver 1 is supplied to the gate of the FET Q1.

The drain of the FET Q1 is connected to one end of a capacitor Co through the diode D1 in a forward direction. The other end of the capacitor Co is grounded. An output voltage Vout is generated in both ends of the capacitor Co. The output voltage Vout is applied to a load 2.

A pulse signal generated in a pulse generator 3 is supplied to the driver 1. For example, a flip-flop, comparator and the like are included in the pulse generator 3. As a set input of the flip-flop, an output pulse of a zero detector 4 is supplied. The zero detector 4 generates a pulse at a timing when a choke coil current is reduced to zero, using a current of a detection coil L2 electromagnetically coupled to the choke coil L1.

As a reset input of the flip-flop of the pulse generator 3, a timing pulse corresponding to an output of a voltage amplifier 5 is supplied. A voltage obtained by dividing the output voltage Vout by resistors 6 and 7 is supplied to one input terminal of the voltage amplifier 5, and a fixed voltage from a reference voltage source 8 is supplied to the other input terminal thereof. The voltage amplifier 5 outputs a voltage having a value according to the difference between the fixed voltage and the divided voltage.

A ramp waveform generator and a comparator are provided within the pulse generator 3. The ramp waveform generator generates a sawtooth wave-like ramp waveform synchronizing with a pulse signal supplied to the gate of the FET Q1. The ramp waveform and the output voltage of the voltage amplifier 5 are supplied to the comparator, and a reset pulse having an edge of a timing when the output voltage of the voltage amplifier 5 intersects the ramp waveform is output from the comparator. Therefore, the reset pulse is generated at an earlier timing as the level of the output voltage of the voltage amplifier 5 becomes lower, and a pulse signal having a short period of a high level is generated. The pulse signal which is output from the flip-flop is supplied to the gate of the FET Q1.

A pulse signal which is set by the zero detection and is changed to a high level and which is reset by the reset pulse from the comparator and is changed to a low level is generated from the flip-flop. This pulse signal is supplied to the gate of the FET Q1 as a drive pulse through the driver 1. The FET Q1 is, for example, an N-channel type, and is turned on for a high-level period of the pulse signal. In the turn-on period, a current flows through the coil L1 and the FET Q1. When the FET Q1 is turned off, a current flows to the capacitor Co through the coil L1 and the diode D1. The terminal voltage of the capacitor Co is extracted as the output voltage Vout. The switching power supply device (PFC circuit) boosts a rectified AC input voltage and converts the boosted voltage into a higher DC voltage.

Figure 2:
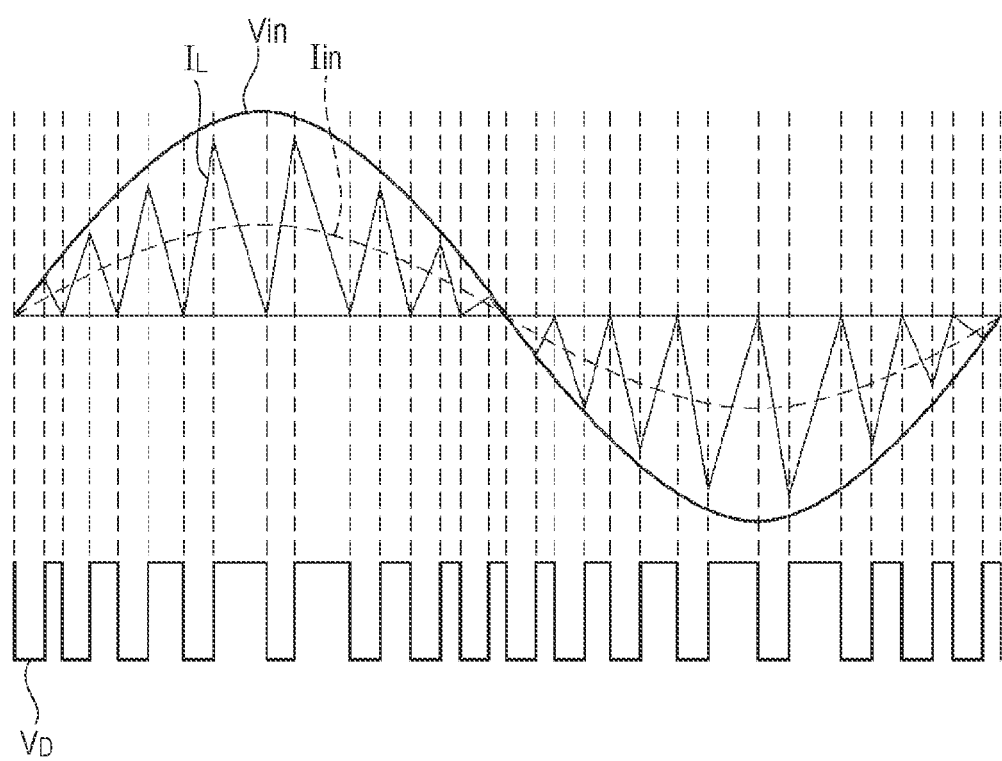
FIG. 2 is a waveform diagram illustrating waveforms of respective sections of the switching power supply device of the related art.

FIG. 2 illustrates waveforms of the respective sections of the power supply device mentioned above. Vin is an input AC voltage waveform, and Iin is an input current waveform. The current waveform becomes substantially sinusoidal similarly to the voltage waveform through PFC control, and a power factor is corrected. Further, $V_D$ is the drain voltage of the FET Q1. The low-level period of the drain voltage $V_D$ is the turn-on period of the FET Q1, and is the turn-off period of the FET Q1 in the high-level period of the drain voltage $V_D$. $I_L$ is an inductor current flowing through the choke coil L1.

The feature of the PFC circuit in a critical mode lies in a system in which the reduction of the current $I_L$ of the choke coil L1 to zero is detected, and control is performed so that a triangular wave appears continuously with reference to zero of the inductor current $I_L$ by turning on the FET Q1 of the semiconductor switching element. Since a switching frequency changes depending on an input voltage in the critical mode, it is considered that within one period of an AC voltage, the frequency is low in a place having a high voltage and the frequency is high in a place having a low voltage. Further, the turn-on period of the FET Q1 which is a semiconductor switching element is determined by a feedback from the output voltage. Thus, at the time of a light load, the peak current of the triangular wave also drops, and the frequency rises overall.

That is, since the output voltage Vout (divided voltage) is relatively high when the load 2 is light, the output voltage of the voltage amplifier 5 drops, and the timing when the reset pulse of the flip-flop of the pulse generator 3 is generated becomes earlier. Therefore, the turn-on time of the FET Q1 is shortened, the peak current also drops, and the frequency rises overall. On the other hand, since the output voltage Vout (divided voltage) is relatively low when the load 2 is heavy, the output voltage of the voltage amplifier 5 rises, and the timing when the reset pulse is generated is delayed. Therefore, the turn-on time of the FET Q1 is lengthened, the peak current rises, and the frequency drops overall.

When the load 2 is light, the switching frequency of the FET Q1 may rise to the frequency of the operating limit of the pulse generator 3 and the driver 1. As a result, a large switching loss in the FET Q1 is exhibited, and efficiency deteriorates. The same is true of the case where semiconductor switching elements other than the FET, for example, IGBTs (Insulated Gate Bipolar Transistors) are used.

It is possible to improve efficiency by detecting a light load and dropping the switching frequency of the semiconductor switching element. Since an oscillator is not included in the case of the switching power supply device in a critical mode, it is necessary to add a variable frequency oscillator.

Figure 3:
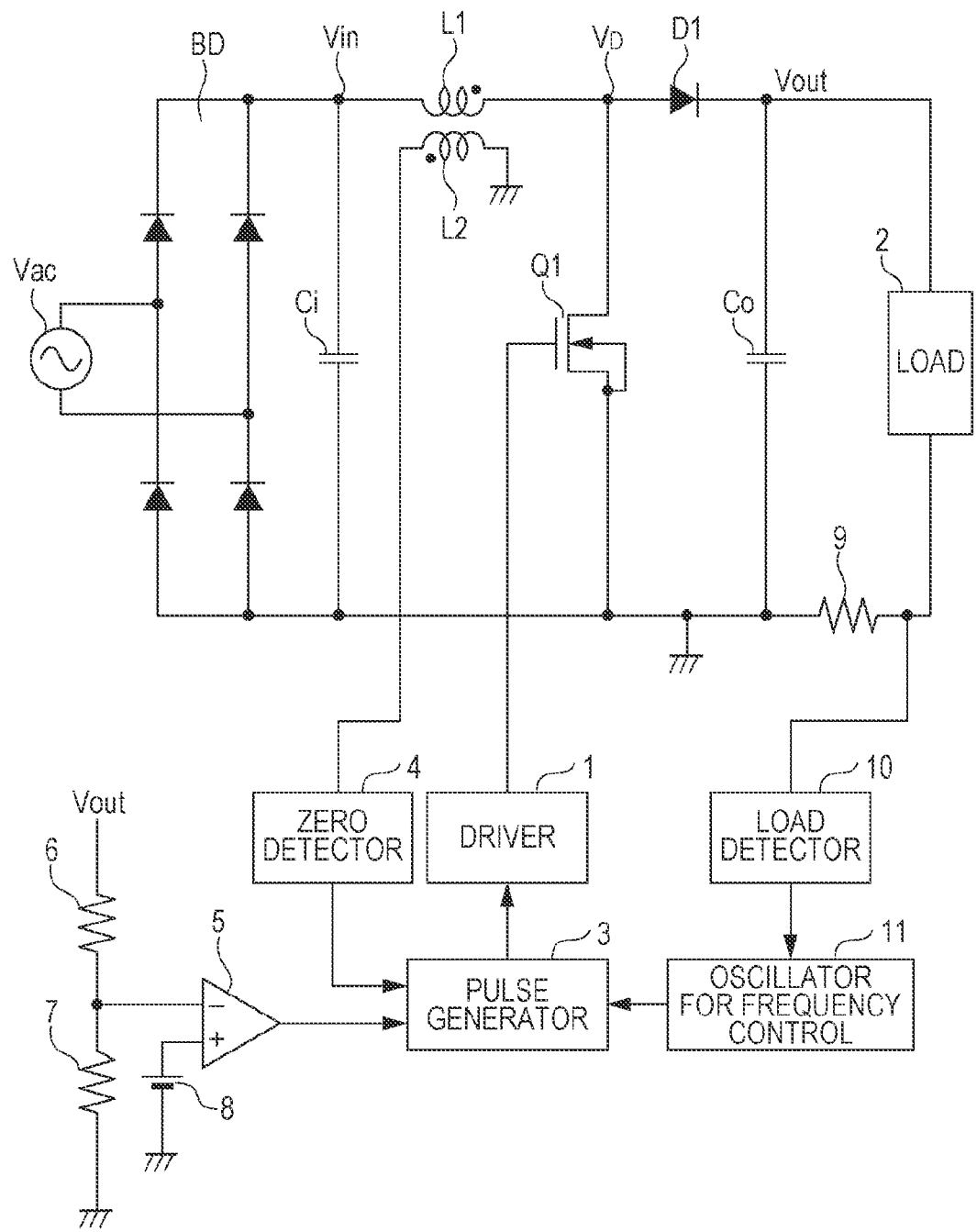
FIG. 3 is a connection diagram illustrating a reference example of the switching power supply device.

FIG. 3 illustrates a configuration of a reference example of the switching power supply device. As shown in FIG. 3, a detection resistor 9 is inserted in a load current path. A voltage drop in the detection resistor 9 is detected by a load detection circuit 10, to thereby detect a load. The detection result is supplied to a variable frequency oscillator 11 as a frequency control voltage. The output of the variable frequency oscillator 11 is supplied to the pulse generator 3, and the upper limit of the frequency of a pulse generated by the pulse generator 3 is restricted by the output of the variable frequency oscillator 11 at the time of a light load.

When a load is light due to such a configuration, efficiency can be improved by restricting the upper limit of the switching frequency. However, in order to accurately detect a light load, it is necessary to select the resistance value of the detection resistor 9 so as to have a value large to some extent, and thus there is a problem in that a large loss in the detection resistor 9 is exhibited, and that efficiency is not able to be sufficiently improved.

2. First Embodiment

Figure 4:
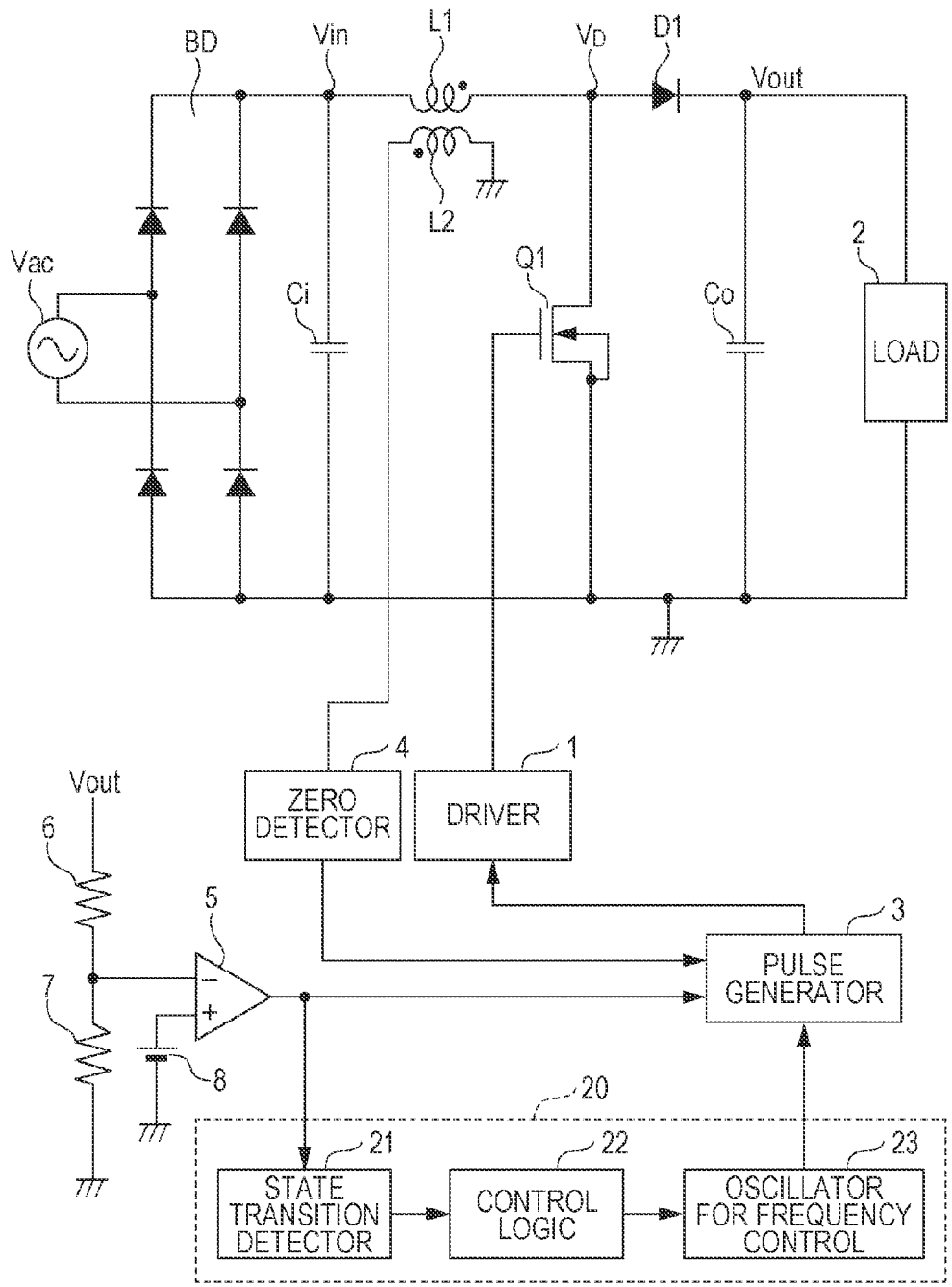
FIG. 4 is a connection diagram of a first embodiment of the present disclosure.

FIG. 4 illustrates a configuration of a first embodiment of the present disclosure. A control system in which the semiconductor switching element is turned on before a current is reduced to zero is referred to as being in a continuous mode. A bridge rectifier circuit BD and a smoothing capacitor Ci rectify an AC voltage of an AC power supply (commercial power supply) Vac and supply a full-wave rectification voltage to the smoothing capacitor Ci. An input (DC) voltage Vin is output to both ends of the smoothing capacitor Ci.

One output terminal (ungrounded side) of the bridge rectifier circuit BD is connected to one end of a choke coil L1, and the other end of the choke coil L1 is connected to one output terminal through a diode D1. The drain and the source of a semiconductor switching element, for example, an N-channel FET Q1 are connected between the connecting point of the other end of the choke coil L1 and the diode D1, and the other output terminal. The source (the other output terminal) of the FET Q1 is grounded, and a drive pulse formed by a driver 1 is supplied to the gate of the FET Q1.

The drain of the FET Q1 is connected to one end of a capacitor Co through the diode D1 in a forward direction. The other end of the capacitor Co is grounded. An output voltage Vout is generated in both ends of the capacitor Co. The output voltage Vout is applied to a load 2.

A pulse signal generated in a pulse generator 3 is supplied to the driver 1. For example, a flip-flop, comparator and the like are included in the pulse generator 3. As a set input of the flip-flop, an output pulse of a zero detector 4 is supplied. The zero detector 4 generates a pulse at a timing when a current of a detection coil L2 electromagnetically coupled to the choke coil L1 is reduced to zero.

A voltage obtained by dividing the output voltage Vout by resistors 6 and 7 is supplied to one input terminal of the voltage amplifier 5, and a fixed voltage from a reference voltage source 8 is supplied to the other input terminal thereof. The voltage amplifier 5 outputs a voltage having a value according to the difference between the fixed voltage and the divided voltage. The output voltage of the voltage amplifier 5 is supplied to the pulse generator 3.

In the first embodiment of the present disclosure, a load is detected from the output voltage of the voltage amplifier 5. That is, the output of the voltage amplifier 5 is supplied to a state transition detector 21 of an additional circuit 20 which is shown surrounded by a broken line. The additional circuit 20 is configured to be added to a switching power supply device of a PFC control system of the related art. The state transition detector 21 compares the output voltage of the voltage amplifier 5 with a threshold (threshold voltage), and determines the state of a load.

The output of the state transition detector 21 is supplied to a control logic 22. The control logic 22 manages a status by receiving the output of the state transition detector 21. The control logic 22 switches the oscillation frequency of an oscillator 23 for frequency control in a plurality of stages. Further, the control logic 22 switches a threshold in the state transition detector 21 in a plurality of stages. The output signal of the oscillator 23 for frequency control is supplied to the pulse generator 3.

Figure 5:
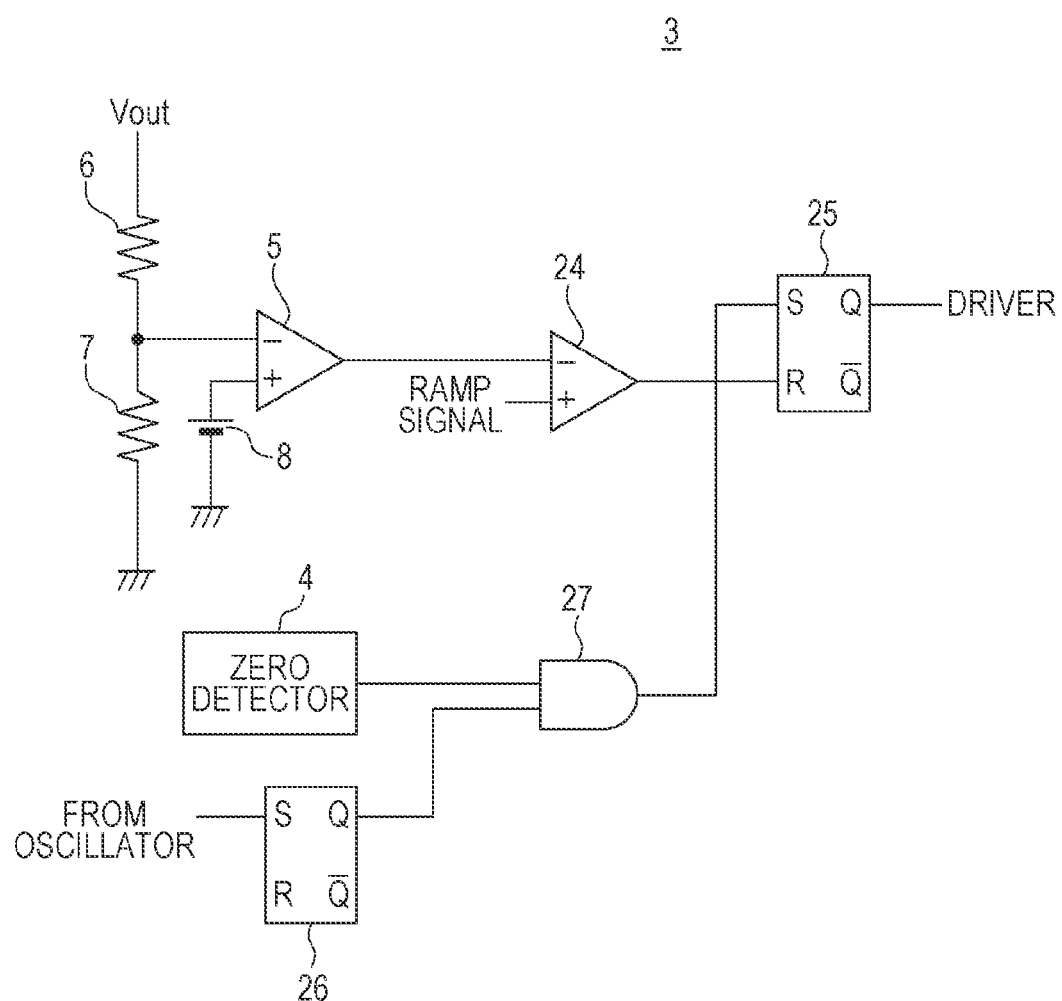
FIG. 5 is a block diagram illustrating an example of a pulse generator according to the first embodiment of the present disclosure.

FIG. 5 illustrates an example of the pulse generator 3 according to the first embodiment of the present disclosure. The output signal of the voltage amplifier 5 is supplied to one input terminal of a comparator 24. The output of a ramp waveform generator (not shown) is supplied to the other input terminal of the comparator 24. The ramp waveform generator generates a ramp waveform synchronizing with a pulse signal supplied to the gate of the FET Q1. The ramp waveform and the output voltage of the voltage amplifier 5 are supplied to the comparator 24, and a reset pulse of a flip-flop 25 is output from the comparator 24 at a timing when the ramp waveform and the output voltage of the voltage amplifier 5 intersect each other. The pulse signal which is output from the flip-flop 25 is supplied to the gate of the FET Q1 through the driver 1.

An output signal of the zero detector 4 and an output signal of a flip-flop 26 are supplied to an AND gate 27. The flip-flop 26 is supplied with the output of the oscillator 23 for frequency control, and is controlled by the control logic 22 so as to output a pulse signal in a control operation during the detection of a light load, and to typically generate an output of a high level in a normal operation (critical mode). Therefore, in the normal operation, a zero detection output similar to the related art is generated from the AND gate 27.

The output of the AND gate 27 is used as the set input of the flip-flop 25. The AND gate 27 uses only the output signal of the zero detector 4 in a period in which the output of the flip-flop 26 is at a high level, as a set input for the flip-flop 25. Therefore, the frequency of the set input uses the frequency of the output of the flip-flop 26 (oscillator 23 for frequency control) as an upper limit frequency.

A pulse signal which is set by the output of the AND gate 27 and is changed to a high level and which is reset by the reset pulse from the comparator 24 and is changed to a low level is generated from the flip-flop 25. This pulse signal is supplied to the gate of the FET Q1 as a drive pulse through the driver 1. The FET Q1 is, for example, an N-channel type, and is turned on for a high-level period of the pulse signal. In the turn-on period, a current flows through the coil L1 and the FET Q1. When the FET Q1 is turned off, a current flows to the capacitor Co through the coil L1 and the diode D1. The terminal voltage of the capacitor Co is extracted as the output voltage Vout. The switching power supply device (PFC circuit) boosts a rectified AC input voltage and converts the boosted voltage into a higher DC voltage.

Figure 6:
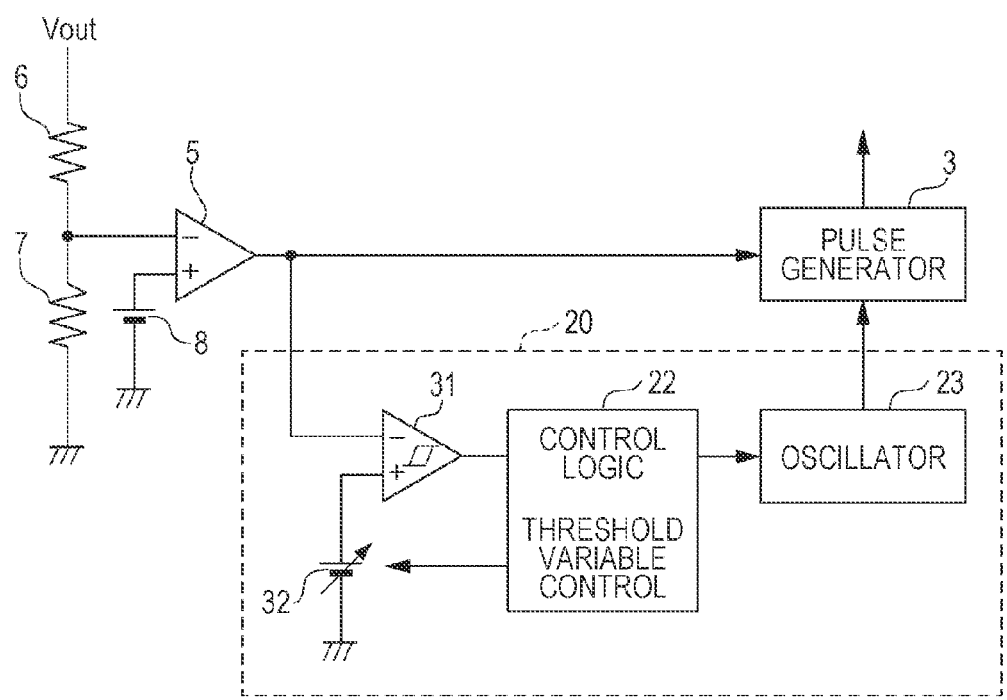
FIG. 6 is a block diagram illustrating an example of an additional circuit according to the first embodiment of the present disclosure.

The configuration of an example of the additional circuit 20 is shown in FIG. 6. The state transition detector 21 is constituted by a comparator 31 and a threshold 32. The value of the threshold is made variable by the control logic 22. A hysteresis width is set with respect to the threshold 32. The hysteresis width refers to a difference between a threshold for dropping a frequency when a load becomes light and a threshold for returning a frequency when a load becomes heavy. The output of the comparator 31 is supplied to the control logic 22. The control logic 22 switches the threshold 32 by receiving the output of the comparator 31, and switches the oscillation frequency of the oscillator 23 for frequency control. The output signal of the oscillator 23 for frequency control is supplied to the pulse generator 3.

Figure 7:
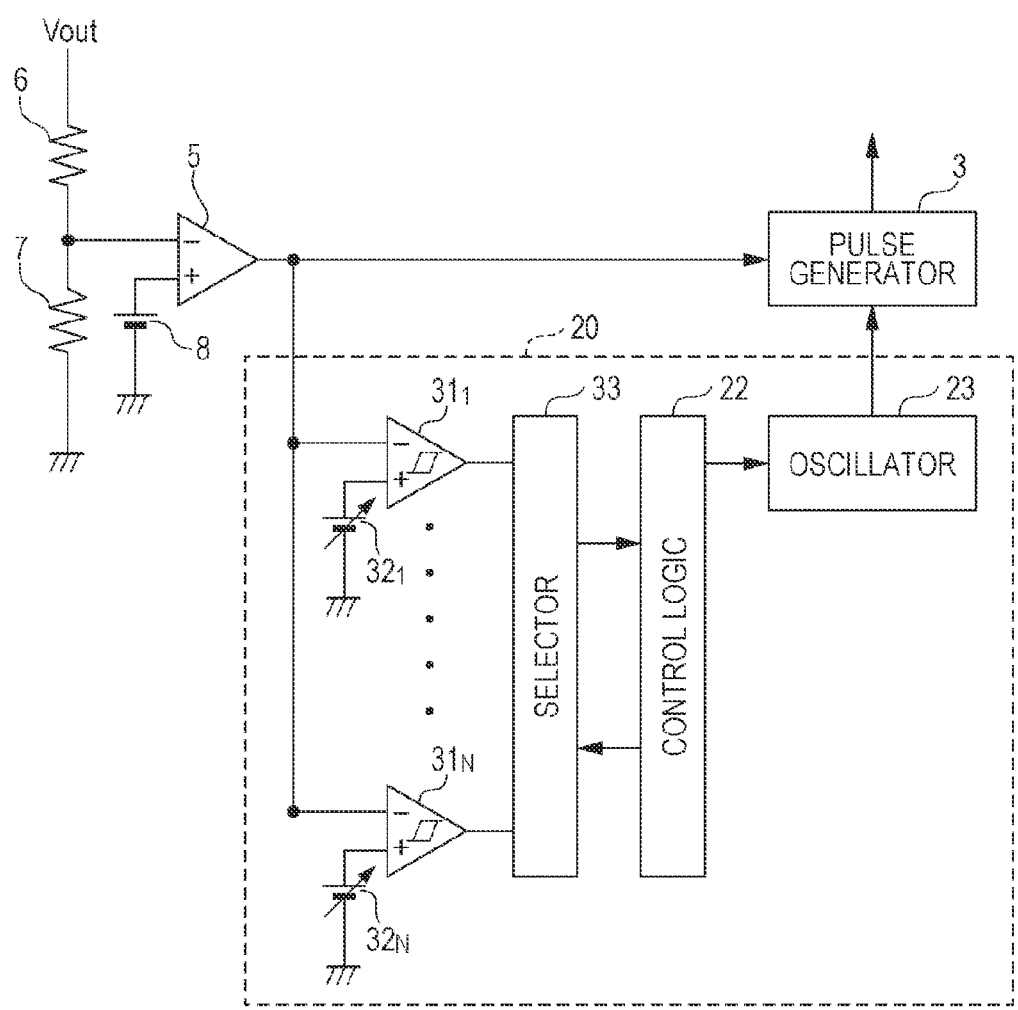
FIG. 7 is a block diagram illustrating another example of the additional circuit according to the first embodiment of the present disclosure.

The configuration of another example of the additional circuit 20 is shown in FIG. 7. In FIG. 7, the additional circuit 20 is constituted by N comparators $31_1$ to $31_N$, N thresholds $32_1$ to $32_N$ of the respective comparators, and a selector 33 that selects any of the outputs within the comparators $31_1$ to $31_N$. Any of the outputs within the comparators $31_1$ to $31_N$ is selected by the selector 33. The threshold can be switched by this selection. Further, the control logic 22 switches the oscillation frequency of the oscillator 23 for frequency control. The output signal of the oscillator 23 for frequency control is supplied to the pulse generator 3.

The waveforms of the respective sections in the first embodiment of the power supply device according to the present disclosure become the same as those shown in FIG. 2 in the normal operation (critical mode), and thus the power factor is corrected. Control based on the control logic 22 will be described with reference to FIG. 8. In the first embodiment, a change in load is detected by monitoring an output voltage Vamp of the voltage amplifier 5. Since the turn-on period of switching of the FET Q1 is determined by the voltage Vamp, the voltage Vamp drops in a case of a light load. When the voltage Vamp falls below a preset threshold, a load is determined to drop below a predetermined value, and the pulse generator 3 is controlled so that the frequency does not rise to any frequency (denoted by fmax) or higher which is determined by the oscillator 23 for frequency control.

Figure 8:
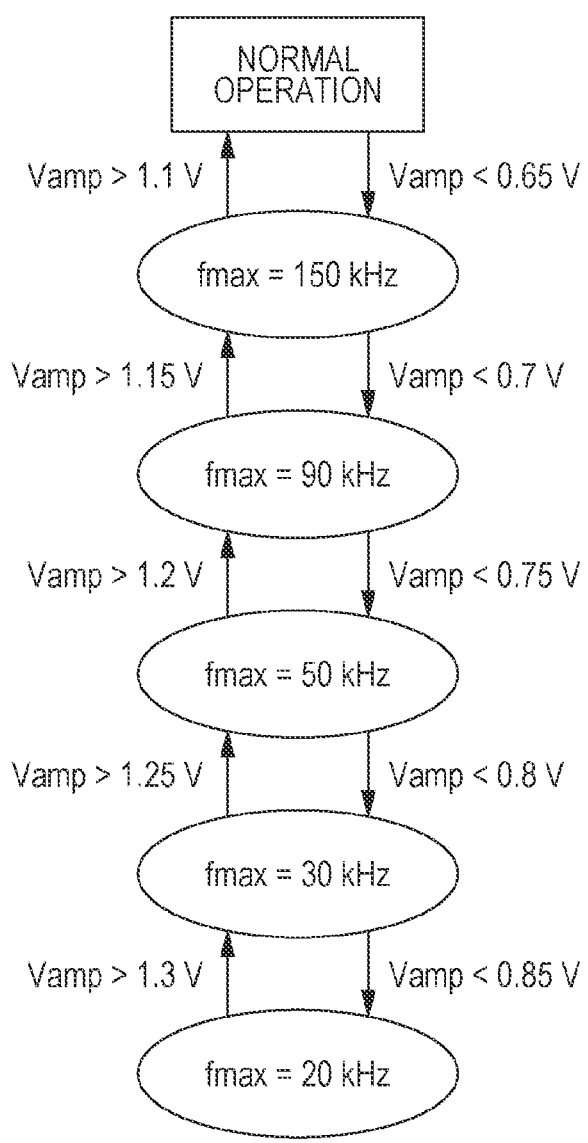
FIG. 8 is a schematic diagram illustrating a state transition used for explaining state switching control according to the first embodiment of the present disclosure.

As shown in FIG. 8, the threshold of the state transition detector 21 when the output voltage Vamp of the voltage amplifier 5 drops is switched to (0.65 V→0.7 V→0.75 V→0.8 V→0.85 V). On the other hand, the threshold of the state transition detector 21 when the output voltage Vamp of the voltage amplifier 5 rises is switched to (1.3 V→1.25V→1.2 V→1.15 V→1.1 V). The difference between the threshold for returning a frequency and the threshold for dropping a frequency in each of the states serves as a hysteresis width.

In the normal operation, when the voltage drops to (Vamp<0.65 V), the oscillation frequency of the oscillator 23 for frequency control is equal to (fmax=150 kHz). Further, as the output voltage Vamp becomes lower, the threshold and the oscillation frequency fmax are switched stepwise as stated above.
   (fmax=90 kHz) when (0.65 V≤Vamp<0.7 V)
   (fmax=50 kHz) when (0.7 V≤Vamp<0.75 V)
   (fmax=30 kHz) when (0.75 V≤Vamp<0.8 V)
   (fmax=20 kHz) when (0.8 V≤Vamp<0.85 V)
On the other hand, as the output voltage Vamp becomes higher, the threshold and the oscillation frequency fmax are switched stepwise as stated above.
   (fmax=30 kHz) when (Vamp>1.3 V)
   (fmax=50 kHz) when (Vamp>1.25 V)
   (fmax=90 kHz) when (Vamp>1.2 V)
   (fmax=150 kHz) when (Vamp>1.15 V)
   Normal operation when (Vamp>1.1 V)

Meanwhile, the number of states may be determined to be any number other than five. Preferably, a change in state of three stages or more is made. The reason for this is to avoid a concern of control being stabilized due to an excessively great change in frequency in a case of two-stage switching between a normal state and a light load state. Further, the frequency value and the threshold in each of the states are an example, and can be set to any value. Further, even when being in any state in order to prevent the generation of an overcurrent of the FET Q1 or the drop of an output voltage in a case of a transient transition to a heavy load, a reset operation for returning to a normal operation can be made. When a load becomes heavy at once from the state of, for example, (fmax=20 kHz), the stepwise return of the state to the normal operation generates a delay, which leads to the problem of the overcurrent of the FET Q1 being generated or the output voltage dropping. Such a problem can be prevented from being generated by the reset operation.

Figure 9:
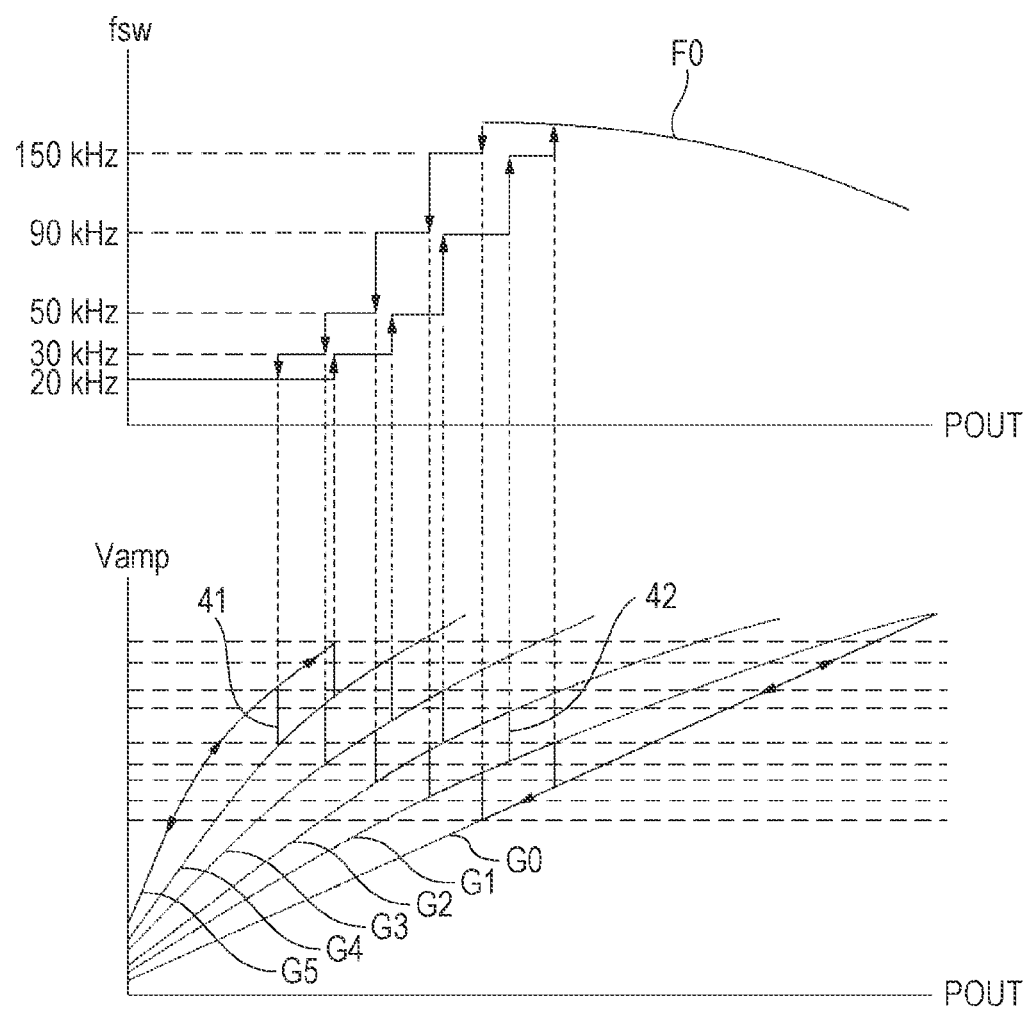
FIG. 9 is a schematic diagram used for explaining the state switching control according to the first embodiment of the present disclosure.

FIG. 9 is a diagram schematically illustrating control of the threshold and frequency according to the first embodiment of the present disclosure. The diagram on the upper side is a graph in which output power Pout is set to a horizontal axis and a switching frequency fsw of the FET Q1 is set to a vertical axis. The output power Pout corresponds to a load, and the output power Pout drops as the load becomes lighter. Until the load drops to predetermined output power Pout, the normal operation in a critical mode is performed. The diagram on the lower side is a graph in which the output power Pout is set to a horizontal axis and the output voltage Vamp of the voltage amplifier 5 is set to a vertical axis.

In the normal operation (critical mode), the frequency fsw changes depending on the output power Pout like a curve shown by F0, and the voltage Vamp changes depending on the output power Pout like a curve shown by G0. When the load becomes light and the voltage Vamp becomes lower than a threshold, for example, 0.65 V, the frequency fsw is switched to, for example, 150 kHz. The frequency is maintained by a hysteresis width. When the upper limit of the frequency is set, the curve of (Pout−Vamp) is changed to G1.

Further, when the load becomes light, Vamp drops as in the curve G1. When the voltage Vamp becomes lower than a threshold, for example, 0.7 V, the frequency fsw is switched to, for example, 90 kHz. The frequency is maintained by the hysteresis width. When the frequency is switched, the curve of (Pout−Vamp) is changed to G2. Hereinafter, the frequency is switched, the curve is changed to G3, G4, and G5, and the frequency fsw drops to a lowest frequency of 20 kHz. Such control is represented by a bent line 41. Meanwhile, the graph of FIG. 9 is expressed so that the frequency fsw changes stepwise and becomes constant at an upper limit frequency in each state. This is for the purpose of simplification, and the frequency fsw fluctuates slightly within a range not exceeding the upper limit frequency in each state.

When the load becomes heavy in a state where the load is lightest, Vamp rises as in the curve G5. When the voltage Vamp becomes higher than a threshold, for example, 1.3 V, the frequency fsw is switched to for example, 30 kHz. The frequency is maintained by the hysteresis width. When the frequency is switched, the curve of (Pout−Vamp) is changed to G4. Hereinafter, as the load becomes heavier, the frequency is switched, and the curve is changed to G3, G2, G1, and G0, which results in a normal state. Such control is represented by a bent line 42.

A specific example of the above-mentioned control will be described below. In the case of a 100 V system, the frequency starts to be dropped from a load factor of 20%, and the frequency is dropped whenever the load factor drops by 2%. In a case of 200 V system, the frequency starts to be dropped from a load factor of 50%, and the frequency is dropped whenever the load factor drops by 10%. Meanwhile, the load factor refers to the ratio of an actual load to a rated load, and the value of the above-mentioned voltage Vamp and the load factor correspond to each other. In a power supply of Rated 200 W, the load factor is 20% at 40

W. A light load means that the load factor is 10% to 30% in a rated power supply of, for example, 100 W to 300 W.

In the first embodiment of the present disclosure, when the frequency is switched, the threshold is also switched. The reason for switching the threshold being necessary will be described below with reference to FIGS. 10 and 11. Generally, when an operation state is switched by a certain threshold by monitoring a voltage, it is necessary that an operation be not stabilized by providing a hysteresis width to the threshold. Additionally, in the first embodiment of the present disclosure, when the frequency is switched, the amplifier output voltage Vamp is also changed. Therefore, when the threshold is not switched, it is very difficult to set the hysteresis width.

Figure 10:
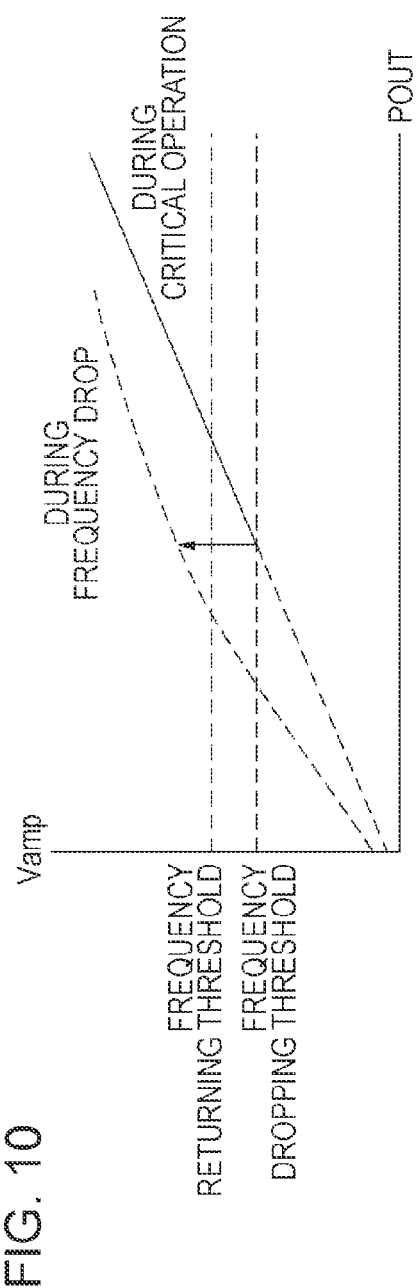
FIG. 10 is a schematic diagram used for explaining the setting of a hysteresis width of thresholds according to the first embodiment of the present disclosure.

FIG. 10 illustrates a graph, for example, when the hysteresis width is set to be small (output power Pout–amplifier output voltage Vamp). The load changes from a heavy load to a light load, the amplifier output voltage Vamp reaches a threshold, the curve of (Pout–Vamp) is switched, and the frequency drops. Due to a drop in frequency, the amplifier output voltage Vamp rises, Vamp becomes higher than the threshold for returning the frequency, and the frequency is restored. In this manner, the switching of frequency is stabilized.

Figure 11:
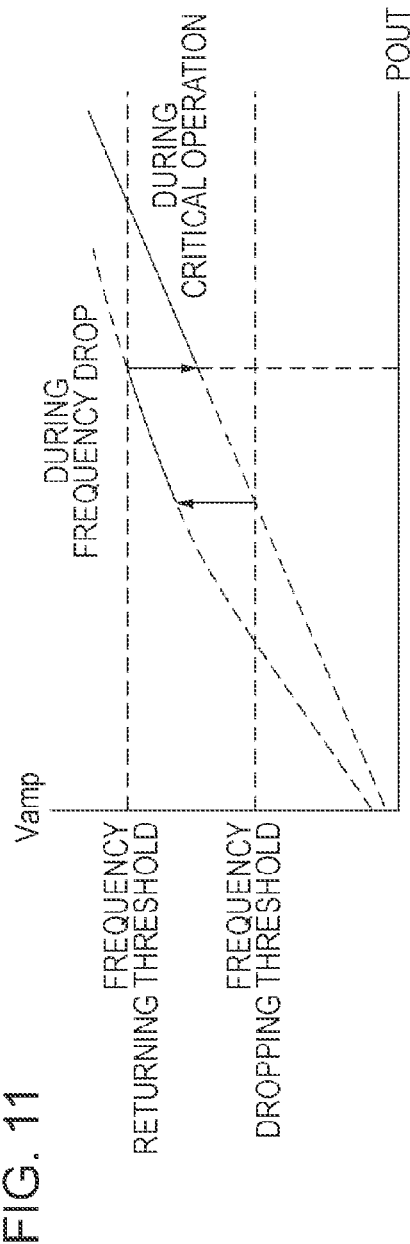
FIG. 11 is a schematic diagram used for explaining the setting of the hysteresis width of the thresholds according to the first embodiment of the present disclosure.

FIG. 11 illustrates a graph when the hysteresis width is set to be large (Pout–Vamp). In this case, it is possible to avoid the problem of the switching of the frequency being stabilized. However, there is a problem in that the amount of change in load becomes excessively large when the load returns from a light load to a heavy load. As a result, a peak current increases, and thus a disadvantage occurs in which a drop in efficiency is caused or a design (increase in cost, or the like) conforming to the peak current has to be made.

In the first embodiment of the present disclosure, when the state (that is, oscillation frequency and threshold) is managed by the control logic 22 and the oscillation frequency is switched, a suitable threshold is set according to the curve of (Pout–Vamp) of the frequency after the switching. Therefore, it is possible to avoid the problem of the hysteresis width which is excessively small or excessively large. A current state is typically ascertained, and thus it is possible to drop the frequency stepwise, and to eventually drop the frequency greatly without suddenly changing the frequency greatly.

Figure 12:
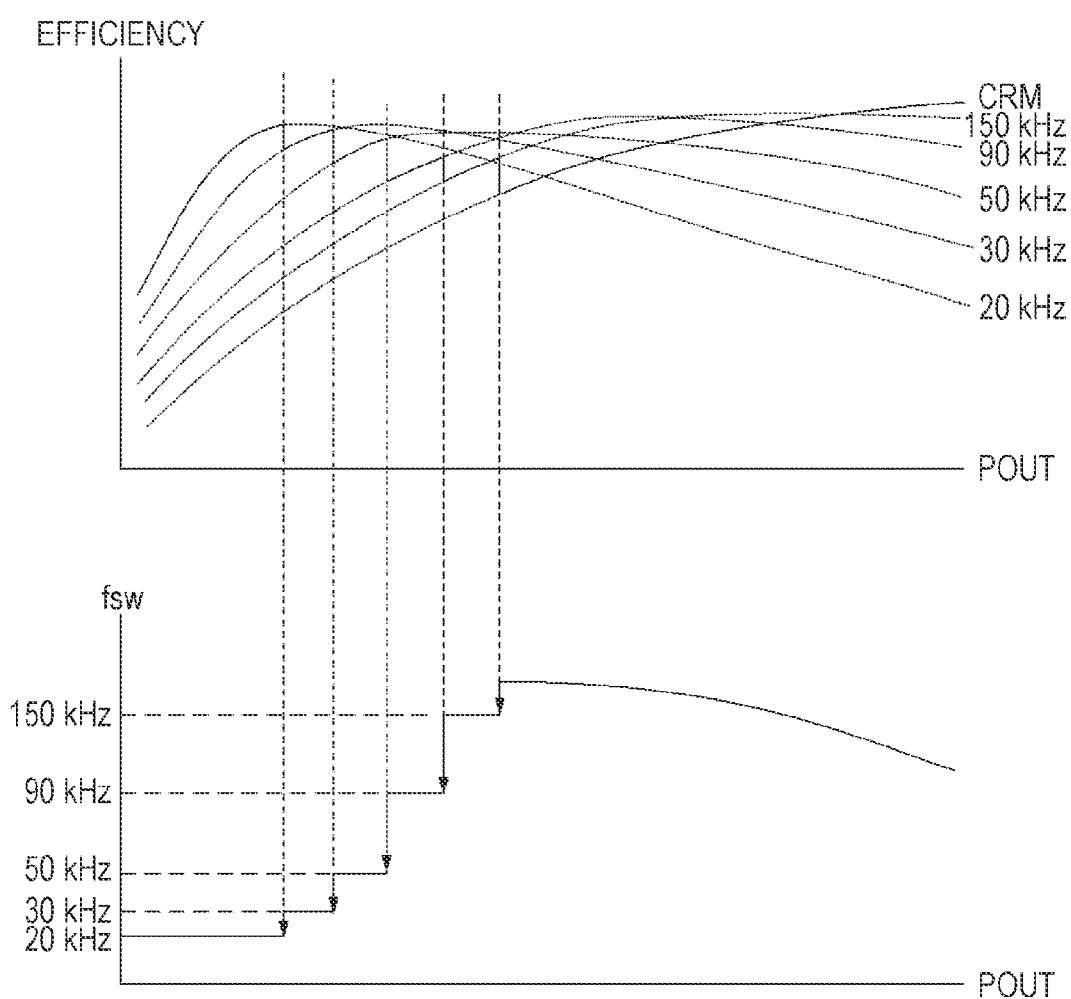
FIG. 12 is a schematic diagram used for explaining an improvement in efficiency according to the first embodiment of the present disclosure.

FIG. 12 illustrates a curve indicating a relationship between the output power Pout and the efficiency, and a curve indicating a relationship between the output power Pout and the frequency fsw. In FIG. 12, the frequency fsw drops in order of 150 kHz, 90 kHz, 50 kHz, 30 kHz, and 20 kHz, as described above, from a normal operation (denoted by CRM). In a range of which the output power Pout is small (range of which the load is light), the low frequency fsw has a good efficiency. However, when the load becomes heavy in a state where fsw is set to 20 kHz, the peak current increases. Therefore, as the load becomes light, the frequency fsw is switched so as to become lower gradually. As a result, it is possible to have good efficiency while preventing the peak current from increasing.

The operations and effects of the first embodiment of the present disclosure are as follows.

1. Since the frequency is dropped at the time of the light load, efficiency at the time of the light load can be improved by reducing a switching loss.

2. A wide range of improvements in efficiency can be made by switching a frequency limiting value stepwise.

3. The frequency can be dropped more greatly by switching the frequency limiting value stepwise.

4. Since the light load is detected by an internal signal of a control circuit (output voltage of the voltage amplifier 5), the present disclosure can be realized without generating unnecessary losses and component costs of the detection resistor and the like of an output line.

3. Second Embodiment

Figure 13:
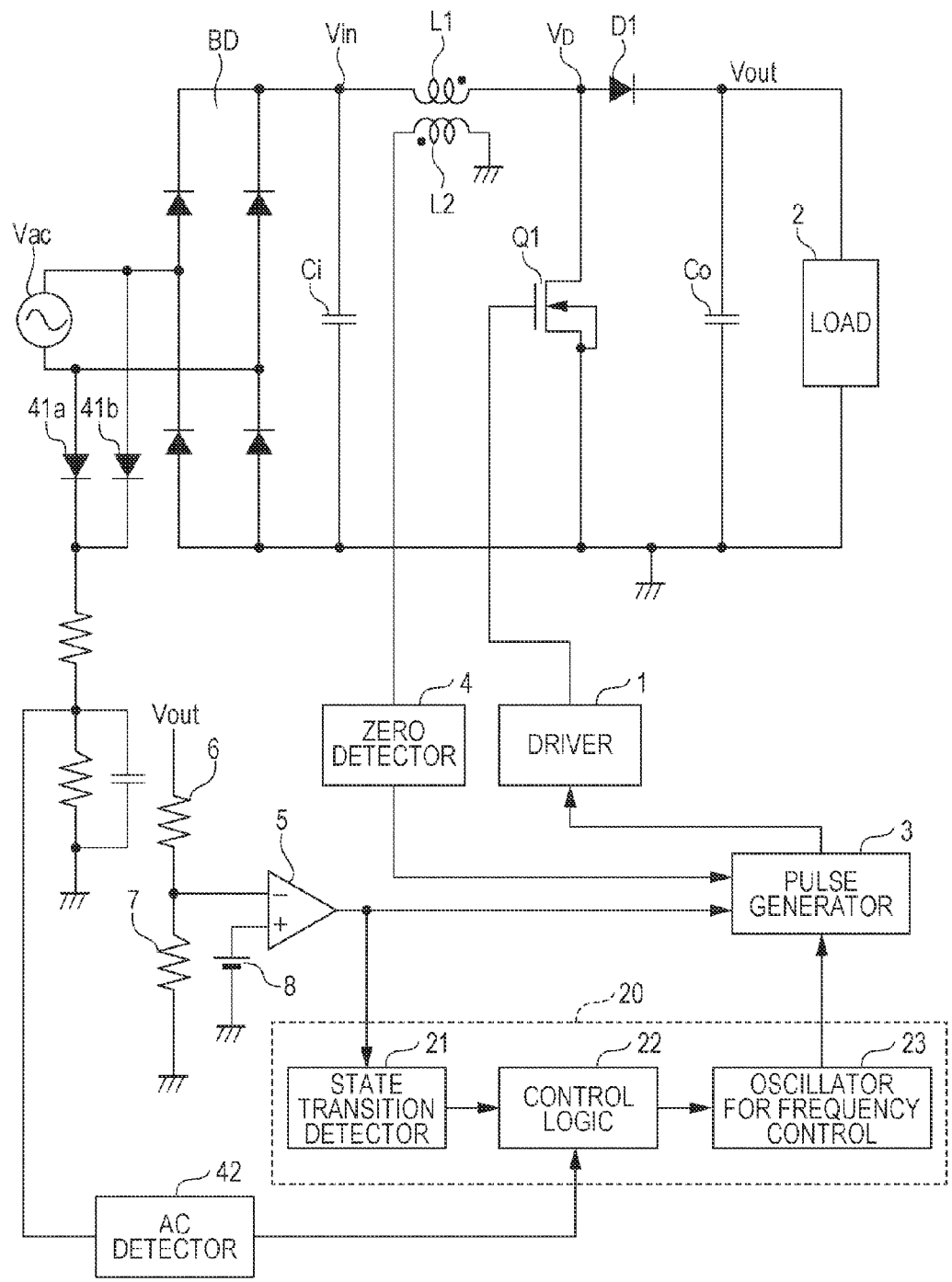
FIG. 13 is a connection diagram of a second embodiment of the present disclosure.

A second embodiment of the present disclosure will be described with reference to FIG. 13. The second embodiment is applied when a plurality of values of an input AC power supply Vac are present. The value of the input AC power supply Vac is 100 V in Japan, whereas this value is sometimes 200 V in foreign countries. Rectifying diodes 41a and 41b are connected to the input AC power supply Vac in parallel with the diode bridge BD. A rectified output is supplied to an alternating current (AC) detector 42.

The AC detector 42 determines whether the value of the input AC power supply Vac is, for example, 100 V or 200 V from the rectified output, and generates a determination signal according to a determination result. This determination signal is supplied to the control logic 22. The control logic 22 can set a plurality of frequency values and a plurality of thresholds when the input AC power supply Vac is 100 V, and a plurality of frequency values and a plurality of thresholds when the input AC power supply Vac is 200 V. The frequency and the threshold are set in accordance with the determination signal of the AC detector 42.

The second embodiment of the present disclosure can exhibit the same operations and effects of those of the above-mentioned first embodiment. Further, the input AC power supply is determined, thereby allowing an optimum frequency and threshold to be automatically set in accordance with the determination result.

4. Application Example

The present disclosure can be applied to a switching power supply device and the like of an electronic apparatus such as an AC adapter and a television receiver.

5. Modification Example

As stated above, although the embodiments of the present disclosure have been described in detail, the present disclosure is not limited to each of the above embodiments, and various modifications based on the technical idea of the present disclosure can be made. For example, configurations, methods, processes, shapes, materials, numerical values, and the like which are mentioned in the above embodiments are merely examples, and configurations, methods, processes, shapes, materials and numerical values, and the like which are different therefrom may be used as necessary.

Meanwhile, the present disclosure can also have the following configurations.

(1) A switching power supply device in a critical mode, including:
a load detection section that detects a load,
wherein when the detected load is lighter than a setting value, an upper limit of a switching frequency is lowered stepwise.

(2) The switching power supply device according to (1), further including:
a series circuit of a coil and a semiconductor switching element;
a rectifier circuit, connected to the semiconductor switching element, in which an output is extracted; and
a pulse generator that generates a pulse signal for switching the semiconductor switching element,
wherein when a load is lighter than a setting value, the pulse generator is controlled in a direction in which an upper limit of a frequency of the pulse signal is lowered stepwise.

(3) The switching power supply device according to (1) or (2), wherein the upper limit of the switching frequency is switched in three stages or more.

(4) The switching power supply device according to any one of (1) to (3), wherein a setting of a load for switching the switching frequency is changed depending on a rating of a power supply.

(5) The switching power supply device according to any one of (2) to (4), wherein a timing is detected by detecting zero of a current flowing to the coil.

(6) The switching power supply device according to any one of (2) to (5), wherein a case in which the load is light is detected from a feedback voltage of an output voltage or a voltage associated with the feedback voltage.

(7) The switching power supply device according to any one of (2) to (6), further including:
a state transition detection section that detects one state in a plurality of states including a normal operation state by comparing the feedback voltage of the output voltage or the voltage associated with the feedback voltage with a threshold;
a control section that sets the upper limit of the switching frequency and the threshold in accordance with the one state which is detected; and
a variable frequency signal oscillator that supplies a signal of the upper limit which is set by the control section to the pulse generator.

(8) The switching power supply device according to (7), wherein a difference between a threshold for lowering the upper limit when the load becomes light and a threshold for raising the upper limit when the load becomes heavy is set.

(9) The switching power supply device according to (7), wherein a reset function of transitioning directly from each of the plurality of states to the normal state is included.

(10) The switching power supply device according to (7), wherein the state transition detection section includes:
a plurality of comparators that compare the feedback voltage or the voltage associated with the feedback voltage with a plurality of thresholds; and
a selector that selects one output in the plurality of comparators.

(11) A method of controlling a switching power supply in a critical mode, including:
lowering an upper limit of a switching frequency stepwise when a load is detected and the detected load is lighter than a setting value.

(12) An electronic apparatus including a switching power supply device in a critical mode,
wherein the switching power supply device includes a load detection section that detects a load, and
when the detected load is lighter than a setting value, an upper limit of a switching frequency is lowered stepwise.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply device in a critical mode, comprising:
a load detection section that detects a load;
an additional circuit, wherein the additional circuit includes a state transition detector, control logic, and a variable frequency signal oscillator;
a pulse generator, including:
a comparator;
a flip flop; and
an AND gate, wherein the comparator of the pulse generator receives a ramp signal from a ramp waveform generator, and a load signal from the load detection section, wherein a reset pulse is provided to a reset input of the flip flop from the comparator when a voltage of the ramp signal intersects a voltage of the load signal, wherein the AND gate receives a frequency control signal from the variable frequency signal oscillator of the additional circuit, and an output signal from a zero detector, and wherein an output of the AND gate is provided to a set input of the flip flop;
wherein, when the state transition detector determines that a voltage of the detected load is lighter than a threshold voltage, the control logic switches a frequency of the control signal of the variable frequency signal oscillator, wherein an upper limit of a switching frequency output by the pulse generator is lowered stepwise, wherein the switching frequency output by the pulse generator is a different, fixed amount for each of at least three stages, and wherein the control logic switches the threshold voltage in a plurality of stages.

2. The switching power supply device according to claim 1, further comprising:
a series circuit of a coil and a semiconductor switching element;
a rectifier circuit, connected to the semiconductor switching element, in which an output is extracted,
wherein the pulse generator generates a pulse signal for switching the semiconductor switching element.

3. The switching power supply device according to claim 2, wherein a timing is detected a by detecting zero of a current flowing to the coil.

4. The switching power supply device according to claim 2, wherein a case in which the load is light is detected from a feedback voltage of an output voltage or a voltage associated with the feedback voltage.

5. The switching power supply device according to claim 4,
wherein the state transition detector detects one state in a plurality of states including a normal operation state by comparing the feedback voltage of the output voltage or the voltage associated with the feedback voltage with the threshold voltage,
and wherein the control section sets the upper limit of the switching frequency and the threshold in accordance with the one state that is detected.

6. The switching power supply device according to claim 5, wherein a difference between a threshold for lowering the upper limit when the load becomes light and a threshold for raising the upper limit when the load becomes heavy is set.

7. The switching power supply device according to claim 5, wherein a reset function of transitioning directly from each of the plurality of states to the normal state is included.

8. The switching power supply device according to claim 5, wherein the state transition detection section includes:
a plurality of comparators that compare the feedback voltage or the voltage associated with the feedback voltage with a plurality of thresholds; and
a selector that selects one output in the plurality of comparators.

9. The switching power supply device of claim 5, wherein each of the at least three stages for which a different switching frequency is output by the pulse generator corresponds to a different one of the plurality of states from which the state transition detector is operable to detect one state.

10. The switching power supply device according to claim 1, wherein the upper limit of the switching frequency is switched in at least three stages.

11. The switching power supply device according to claim 1, wherein a setting of a load for switching the switching frequency is changed depending on a rating of a power supply.

12. The switching power supply device of claim 1, wherein a frequency of the variable frequency signal oscillator sets an upper limit of the switching frequency.

13. The switching power supply device of claim 12, wherein the upper limit frequency is not equal to a frequency of the ramp signal when the detected load is lighter than the threshold.

14. A method of controlling a switching power supply in a critical mode, comprising:
    lowering an upper limit of a switching frequency stepwise when a load is detected by a load detection circuit and the detected load is lighter than a setting value, wherein the switching frequency is controlled by a pulse generator in response to a ramp signal, a signal from the load detection section, and a signal from a variable frequency signal oscillator provided as part of an additional circuit, wherein the pulse generator includes:
        a comparator;
        a flip flop; and
        an AND gate, wherein the comparator of the pulse generator receives a ramp signal from a ramp waveform generator, and a load signal from the load detection section, wherein a reset pulse is provided to a reset input of the flip flop from the comparator when the ramp signal intersects the load signal, wherein the AND gate receives a frequency control signal from the variable frequency signal oscillator of the additional circuit, and an output signal from a zero detector, wherein an output of the AND gate is provided to a set input of the flip flop,
    wherein the additional circuit further includes a state transition detector and control logic, wherein, when the state transition detector determines that a voltage of the detected load is lighter than a threshold voltage, the control logic switches a frequency of the control signal of the variable frequency signal oscillator, wherein an upper limit of a switching frequency output by the pulse generator is lowered stepwise, wherein the switching frequency output by the pulse generator is a different, fixed amount for each of at least three stages, and wherein the control logic switches the threshold voltage in a plurality of stages.

15. An electronic apparatus comprising a switching power supply device in a critical mode,
    wherein the switching power supply device includes a load detection section that detects a load, and
    when the detected load is lighter than a setting value, an upper limit of a switching frequency is lowered stepwise by a pulse generator in response to a ramp signal, a signal from a load detection section, and a signal from a variable frequency signal oscillator provided as part of an additional circuit, wherein the pulse generator includes:
        a comparator;
        a flip flop; and
        an AND gate, wherein the comparator of the pulse generator receives a ramp signal from a ramp waveform generator, and a load signal from the load detection section, wherein a reset pulse is provided to a reset input of the flip flop from the comparator when the ramp signal intersects the load signal, wherein the AND gate receives a frequency control signal from the variable frequency signal oscillator of the additional circuit, and an output signal from a zero detector, wherein an output of the AND gate is provided to a set input of the flip flop,
    wherein the additional circuit further includes a state transition detector and control logic, wherein, when the state transition detector determines that a voltage of the detected load is lighter than a threshold voltage, the control logic switches a frequency of the control signal of the variable frequency signal oscillator, wherein an upper limit of a switching frequency output by the pulse generator is lowered stepwise, wherein the switching frequency output by the pulse generator is a different, fixed amount for each of at least three stages, and wherein the control logic switches the threshold voltage in a plurality of stages.

\* \* \* \* \*